June 18, 1940.  J. A. CRAMER  2,204,927
ROOF FRAMING IMPLEMENT
Filed Dec. 19, 1938   3 Sheets-Sheet 1
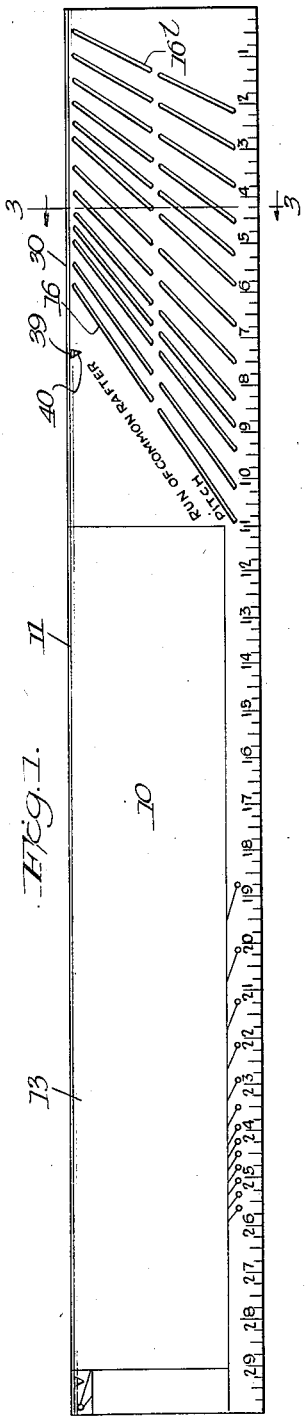
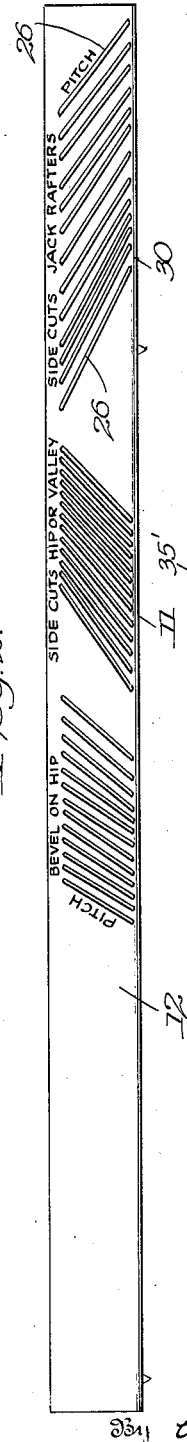
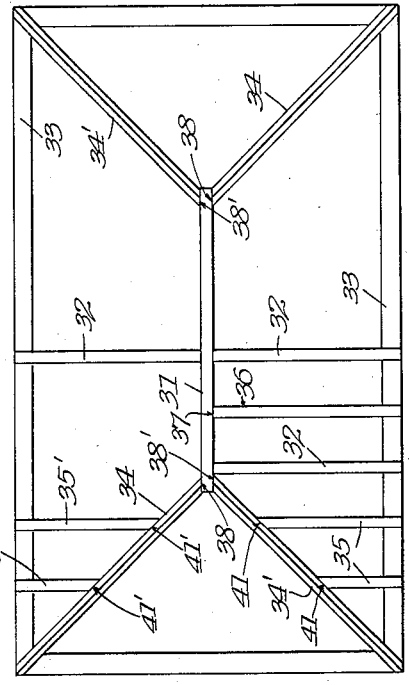
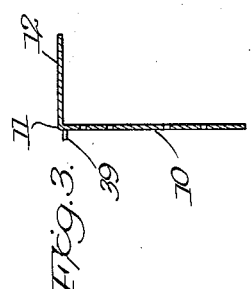
Inventor
John A. Cramer,
By Cushman Darby Cushman.
Attorneys

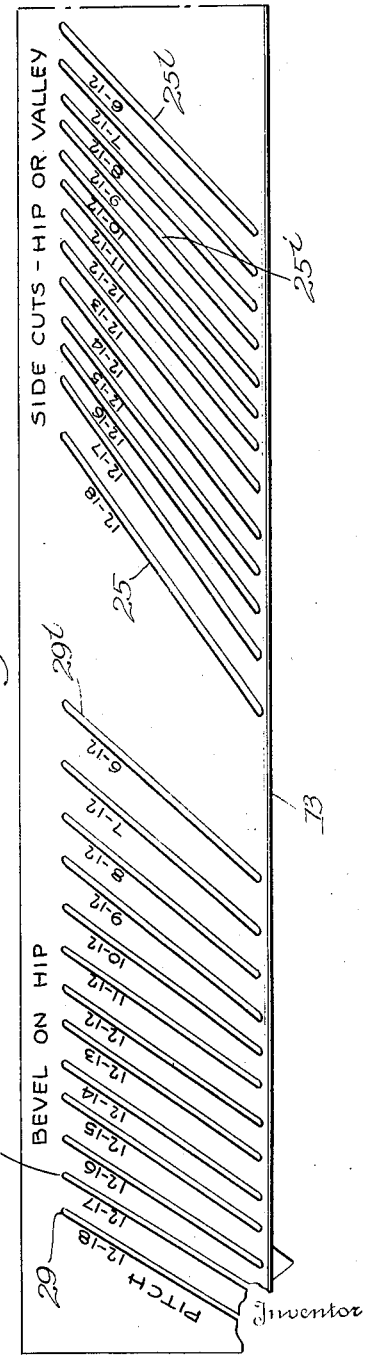

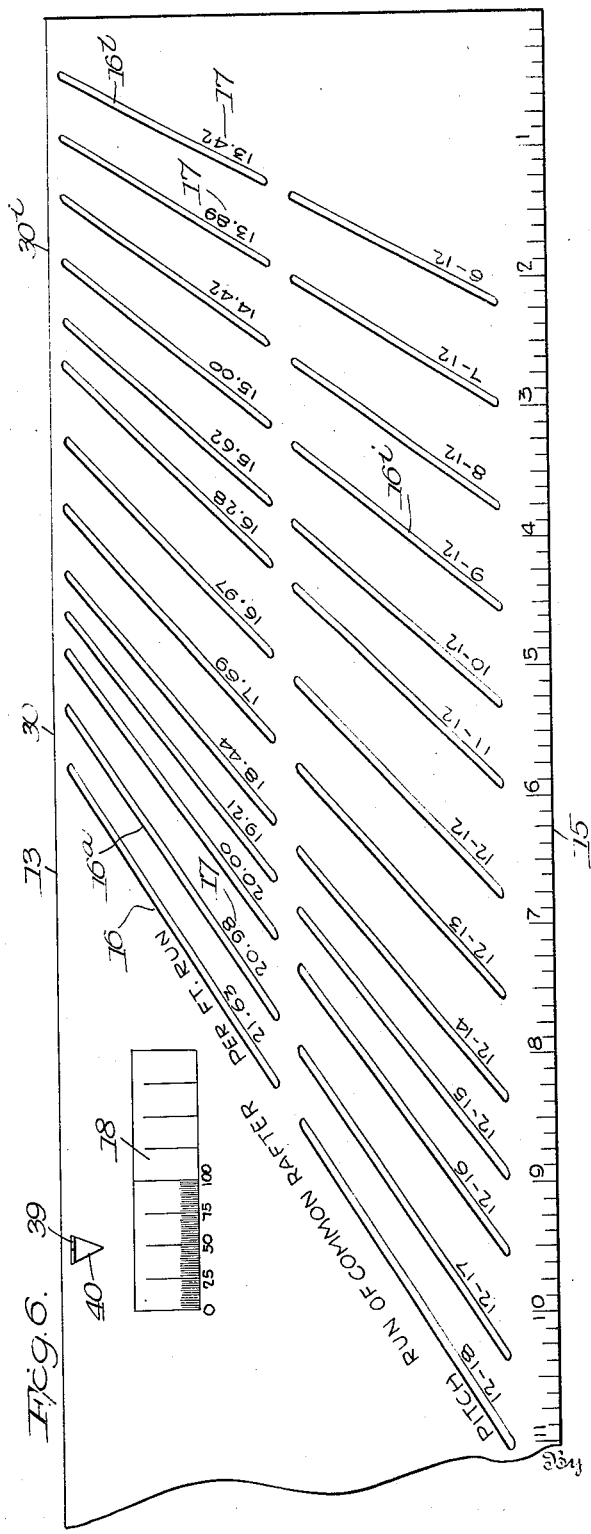
June 18, 1940.  J. A. CRAMER  2,204,927
ROOF FRAMING IMPLEMENT
Filed Dec. 19, 1938    3 Sheets-Sheet 3
Inventor
John A. Cramer.

Patented June 18, 1940

2,204,927

UNITED STATES PATENT OFFICE 2,204,927

ROOF FRAMING IMPLEMENT

John A. Cramer, Ogden, Utah,

Application December 19, 1938, Serial No. 246,721

3 Claims. (Cl. 33—112)

This invention relates to an implement for use in framing the roofs of buildings. More particularly, the implement is used for determining the angles of cut of the ends of common rafters, hip and valley rafters and jack rafters and for determining the lengths of such rafters.

It is an object of the invention to provide an implement which will dispense with the laborious work of "laying off with a square," or otherwise calculating the lengths of rafters for buildings of various sizes having any one of a great plurality of different roof pitches. According to conventional practice, the lengths of rafters must either be calculated arithmetically when the size of a building and the pitch of the roof have been selected, or the carpenter must use a standard steel square to measure the length of the rafter, by the "multi-position" method. The latter method is likely to result in error, unless extreme care is exercised in repeatedly laying the square upon the rafter and marking each unit of length, while the arithmetical computation of rafter lengths is tedious and complicated.

In accordance with the present invention, an implement is provided wherein a table of rafter lengths and pitches is provided. Hence, the carpenter need only refer to the table to determine the length of the rafters for a particular size of building and pitch of roof.

It is a further object of the invention to provide means for conveniently marking, on the rafter itself, the line of the angle of cut for the ends of the rafter. To this end, the implement is provided with a plurality of marking slots, disposed on angular lines corresponding to the angles of cut for rafters of roofs of various standard pitches.

It is a further object to provide, in an implement of the character described, means for marking the lines of the correct angles of cut of the upper ends of hip and valley rafters and of jack rafters. Since the planes of cut of the upper ends of hip, valley and jack rafters are disposed at oblique angles to the upper longitudinal corners of the rafters, the invention provides means for marking the correct angular lines on the upper edge faces of the rafters.

It is a further object of the invention to provide means for marking the angles of the backing or bevel for the upper edge faces of hip rafters for standard roof pitches.

In order to carry out the objects of the invention, an implement is provided wherein a web of sheet material is adapted to be juxtaposed upon the side face of a rafter and an integral flange projects therefrom in a plane perpendicular with respect thereto, in position to lie upon the upper edge face of the rafter. A plurality of sets of marking slots or apertures are arranged on different angles on the web and flange of the implement. Appropriate markings are associated with each slot or aperture, indicating the function of that slot and the particular roof pitch with which it should be used.

Other objects and advantages of the invention will become apparent to one skilled in the art, from a consideration of the following description of an illustrative embodiment of the invention shown in the accompanying drawings.

In the drawings:

Figure 1 is an elevational view of the implement.

Figure 2 is a view taken at right angles, showing the flange in elevation.

Figure 3 is a sectional view taken on line 3—3 of Figure 1.

Figure 4 is a plan view of a conventional roof frame.

Figure 5 is a fragmentary, enlarged view of the left-hand end of Figure 1.

Figure 6 is a similar view of the right-hand end of Figure 1.

Figure 7 is a similar view showing the central section of Figure 2, and

Figure 8 is a similar view showing the right-hand end of Figure 2.

The implement may be constructed of any suitable sheet material, such as sheet metal, pyroxylin, or other cellulosic material, synthetic resin, heavy paper, cardboard or the like. It comprises a main sheet, strip or web 10, folded or otherwise shaped at an edge or corner 11 to provide a flange 12 projecting in a perpendicular plane with respect to the web. If desired, the implement may be made of relatively flexible material so that the flange 12 can be straightened out to lie in the plane of the web 12 when not in use. However, it is preferred to use relatively rigid, stiff material, so that the angularly disposed relation of the web and flange is maintained. On the front face of the web 10, a table 13 of previously calculated figures is printed, engraved, embossed or otherwise formed. The first table 13a (Fig. 5) gives figures corresponding to one-half the width of a plurality of standard sizes of buildings, for instance, from 1 foot to 18 feet, for buildings having widths ranging from 2 feet to 36 feet. The column of Figure 14 gives the pitch of the roof, for instance, from a 6 inch rise per foot of run to an 18 inch rise per foot of run. The figures opposite the pitch figures and under the width figures, in the table 13a, give the lengths of common rafters in feet, inches and hundredths of inches.

The table 13b gives the corresponding information for the length of hip or valley rafters. In column 14, the standard roof pitches are repeated, while under the building width figures, the rafter lengths are given.

In the accompanying drawings, all of the figures have not been reproduced, but it will be understood that, in an actual implement, the tables will be complete.

Referring to Figure 6, which represents the right-hand end of the main web 10, a plurality of slots are disposed on predetermined angles with respect to the edge 11 and the edge 15. The latter edge is preferably ruled and marked in inches, as indicated, from 1 to 30 inches. The several slots 16, 16a—16l correspond to the pitches included in the tables 13a and indicate the correct angle of plumb cut for the ends of common rafters and jack rafters. In addition, adjacent each cut, a figure 17 is given, indicating the number of inches of rafter length for each foot of run of the roof for that particular pitch.

As indicated in Figure 6, it is convenient to provide on the face of the implement, a rule 18 showing inches marked off into hundredths, as it is often necessary to mark accurately, a desired number of hundredths of an inch, in marking rafter lengths.

As shown in Figure 5, at the upper left-hand corner of the web 10, a marking aperture 19 is positioned. A plurality of lines 20, 20a—20l extend radially from the aperture 19 on a plurality of different angles and terminate in marking apertures 21, 21a—21l. As pointed out below, these apertures are utilized for marking the bottom, horizontal cuts for the lower ends of hip or valley rafters of pitches corresponding to the pitches in the table 13b.

The flange 12 is provided with a plurality of sets of marking slots, to facilitate marking the lines of angles of side cuts on the top face of hip or valley rafters and the lines of the side cuts on the top face of jack rafters. If desired, an additional set of marking slots may be provided, to indicate the correct angles of the backing or bevel cuts for the top edge faces of hip rafters.

Referring to Figure 7, the slots 25, 25a—25l indicate the angles of side cuts for the upper ends of hip or valley rafters corresponding to the pitches on the table, and the pitches are indicated by appropriate figures associated with the slots. Similarly, the slots 26, 26a—26l (Fig. 8) represent the angles for the lines of side cuts for the ends of jack rafters of roofs having corresponding pitches. In addition to the markings 27 indicating the standard pitches, the slots 26—26l have markings 28 associated therewith, indicating how much shorter each jack rafter should be cut, as compared with the last common rafter and each adjacent jack rafter.

It should be noted that the marking slots 16—16l on the web 10 for the plumb cuts of common and jack rafters are arranged in pairs with the marking slots 26—26l on the flange for the side cuts of jack rafters. For instance, the slot 16 is disposed on a line which intersects the corner 13 at point 30. The slot 26 intersects the corner 13 at the same point, 30. The same is true of the slots 16a—l and 26a—l, each pair intersecting the corner at points 30a—l, respectively.

The slots of each pair are adapted to be used for marking the lines on the side face and top surface of a rafter indicating the plane of cut for the upper end of a jack rafter of a particular pitch. For instance, if the roof pitch is 18 inches rise to 1 foot of run, the slot 16 will indicate the plumb cut for both jack and common rafters. The slot 26 will indicate the line of the angle of the side cut, to be drawn upon the top edge face of the rafter.

The slots 29, 29a—29l, indicate the angles of backing or bevel for the upper edges of hip rafters, to make the roof boards extending from the hip rafters to the adjacent jack and common rafters lie flat or flush with the upper face of the rafters.

Figure 4 is a diagrammatic plan view of a roof frame, wherein a ridge board is shown at 31, common rafters at 32, extending from the ridge board to the wall plate 33. Hip rafters 34, 34' extend from the side faces of the ends of the ridge board to the corners of the building, and jack rafters 35, 35' extend from the hip rafters to the plate.

In explaining the use of the implement of the present invention, we will assume that the building in Figure 4 is 16 feet wide and 20 feet long and that the roof is to have a 9/12 pitch, i. e., 9 inches rise to 1 foot of run. In order to determine the lengths of the common rafters 32, the carpenter refers to the table 13a. Opposite the pitch selected, he finds the rafter length, under the column marked 8 ft., since that is half the width of the building. The table shows that the common rafters should be 10 feet long. The carpenter then marks off 10 feet on a rafter and lays the implement upon it, with the web 10 along the side face and the flange 12 over the top. He moves the implement along the rafter until the point 30i coincides with the upper end mark he has drawn. He then draws a line in the slot 16i, which will give him the plumb cut for the upper end of the common rafter. Similarly, the implement may be moved to the other end of the rafter and a plumb cut drawn at that end, or at a point spaced below the lower marking, to provide the desired length of "look-out" or tail. The common rafters are then sawed on these lines on planes 37, perpendicular to the side faces 36 of the rafters.

In order to determine the length of the hip rafter 34, the carpenter refers to the table 13b. For a 12/9 pitch, under the column "8 ft.", he will find the figure 12'—9".68. This gives the length of the hip rafter. For the bottom, horizontal end cut of the hip rafter, the implement is laid upon the rafter with the aperture 19 at the outermost end thereof and with the lines 29—29l extending toward the opposite side edge. The carpenter makes marks through the opening 19 and 21i. Thereupon, he scribes a line through the marks and this line represents the correct plane of cut for the bottom end of the rafter.

In order to determine the angle of the side cut 38, to be drawn on the top face of the hip rafter 34 at the upper end thereof, the carpenter uses the slot 25i, Figure 7. He slides the implement along the rafter until the upper end mark is reached, whereupon he draws a line through the slot 25i to mark on the top face of the rafter, the correct angle for the side cut. For the hip rafters 34', a slightly different procedure is necessary, because the angle of cut is opposite or at right angles to that used with the rafters 34. The implement is simply turned upside down, with the web 10 projecting up above the side face of the rafter in the plane thereof, instead of being positioned against the side face. However, it is a simple matter to draw a line through the same slot 25i, which will give the correct angle. In order to prevent inadvertent movement of the implement, when inverted in this manner, tongues 39 are struck from apertures 40 in the web 10. These tongues and the apertures serve as marking and indexing means to make certain that the tool, when inverted, is accurately positioned.

In determining the length of the jack rafters 35, spaced on 24 inch centers, the carpenter refers to the figures positioned adjacent the slots 26—26l. Since the building under consideration has a 12/9 pitch, the carpenter uses the figures associated with the slot 26i. He finds that the first jack rafter should be cut 30 inches shorter than the common rafters and that each succeeding jack rafter should be 30 inches shorter than the preceding one.

The upper ends of all of the jack rafters for a particular pitch roof should be cut on the same angular plane. The slot 16i will be used to mark the plumb cut on the side face of the rafter, and, without moving the implement, the slot 26i will be used to mark the line of the side cut on the top face of the jack rafter. These two lines determine the plane along which the carpenter should saw through the jack rafter to make the proper upper end cut.

In Figure 4, the lines 41 represent the line of side cut on the top surface of the jack rafters 35. For the jack rafters 35', an opposite cut must be made, i. e., at right angles to the cut 41, as indicated at 41'. The implement is inverted for the purpose of marking this cut, and the line is drawn through the slot 26i, the indexing apertures 40 being used as previously explained.

The lines for the plumb cuts of the hip rafters may be drawn, either by using a steel square or by marking a horizontal line by the use of the apertures 19 and 21i and then drawing a line at right angles thereto. If the conventional method of using a steel square is employed, the carpenter substitutes 17 inches for the 12 inches of run used in connection with common rafters. That is, for the specific example under consideration, he lays the steel square on the upper end of the hip rafter with the numbers 17 and 9, on the two legs of the square in registry with the edge of the rafter. The line drawn across the side face of the rafter along the short leg, will be the plumb cut for the hip rafter. If he uses the apertures 19 and 21i, he simply draws a line at right angles thereto, through the upper end point of the rafter, and the latter will be a plumb line.

Although the invention has been described with considerable particularity in this specification, it must be understood that it is not limited to the specific arrangement of parts shown in the accompanying drawings and described above, but covers all modifications coming within the scope of the appended claims and their equivalents.

I claim:

1. A roof rafter marking implement comprising a web and a flange joined along a longitudinal edge and disposed in perpendicular planes, whereby the implement may be laid upon a rafter with the web and flange juxtaposed respectively upon the side face and the top edge face of the rafter, said web having an aperture at one corner adjacent said longitudinal edge and a plurality of apertures spaced along the opposite longitudinal edge, the last-mentioned apertures being so positioned that lines extending thereto from the first aperture are disposed on angles with respect to the first-mentioned longitudinal edge corresponding to the angles of horizontal bottom end cuts of hip rafters of different standard roof pitches, said web being imperforate throughout the area between the apertures, said flange having a series of marking slots extending toward the first-mentioned longitudinal edge on angles corresponding to the lines of the side cuts of the upper ends of hip rafters for roofs of the same standard pitches, whereby the implement may be laid upon a hip or valley rafter and the rafter marked through the appropriate apertures and slots to indicate the angles of the horizontal, bottom end cut and the upper end side cut, said implement further having a series of marking slots extending toward the first-mentioned longitudinal edge on angles corresponding to the angles to be cut on the top faces of hip rafters for roofs of the same standard pitches.

2. A roof rafter framing implement comprising an elongated web of sheet material and a flange projecting from one edge of the web in a plane perpendicular thereto, whereby the implement may be laid upon a rafter with the web and flange thereof juxtaposed against the side and top faces of the rafter, said web having formed therein a plurality of marking apertures disposed on lines meeting said edge on angles corresponding to the angles of horizontal, bottom end cuts for hip rafters of a plurality of different standard roof pitches, said flange having formed therein a plurality of marking apertures disposed on lines meeting said edge on angles corresponding to the angles of side cuts for the upper ends of said hip rafters of roofs of said standard pitches, said flange further having formed therein a plurality of marking apertures disposed on lines meeting said edge on angles corresponding to the angles of bevel to be cut on the top faces of said hip rafters of said standard roof pitches, whereby said implement may be used to mark on a hip rafter the lines for all of said cuts.

3. A roof rafter framing implement comprising an elongated web of sheet material and a flange projecting from one edge of the web in a plane perpendicular thereto, whereby the implement may be laid upon a rafter with the web and flange thereof juxtaposed against the side and top faces of the rafter, said web having formed therein a marking aperture adjacent said edge and a plurality of apertures spaced along the opposite longitudinal edge, the web between said apertures being imperforate, the last mentioned apertures being disposed on lines intersecting the first mentioned aperture and the first mentioned edge on angles corresponding to the angles of horizontal, bottom end cuts for hip rafters of a plurality of different standard roof pitches, said flange having formed therein a plurality of elongated marking slots disposed on lines meeting said edge on angles corresponding to the angles of side cuts for the upper ends of said hip rafters of roofs of said standard pitches, said flange further having formed therein a plurality of elongated marking slots disposed on lines meeting said edge on angles corresponding to the angles of bevel to be cut on the top faces of said hip rafters of said standard roof pitches, whereby said implement may be used to mark on a hip rafter the lines of all of said cuts.

JOHN A. CRAMER.